Aug. 27, 1957  F. H. ETZELT  2,803,937
AUXILIARY SUPPORTING MEANS FOR POWER MOWERS
Filed Nov. 14, 1955  2 Sheets-Sheet 1

Fred H. Etzelt
INVENTOR.

BY *Clarence A. O'Brien*
*and Harvey B. Jacobson*
Attorneys

Aug. 27, 1957 F. H. ETZELT 2,803,937
AUXILIARY SUPPORTING MEANS FOR POWER MOWERS
Filed Nov. 14, 1955 2 Sheets-Sheet 2
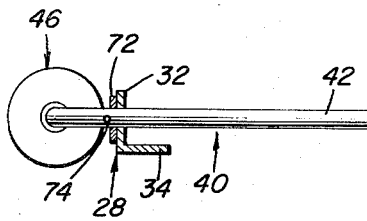
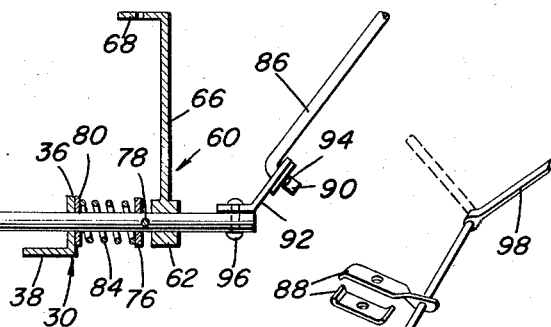
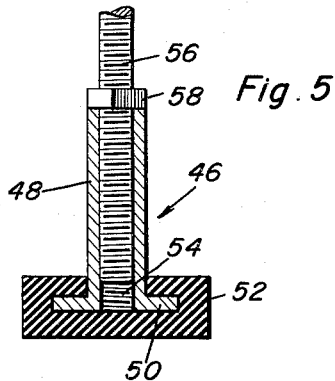
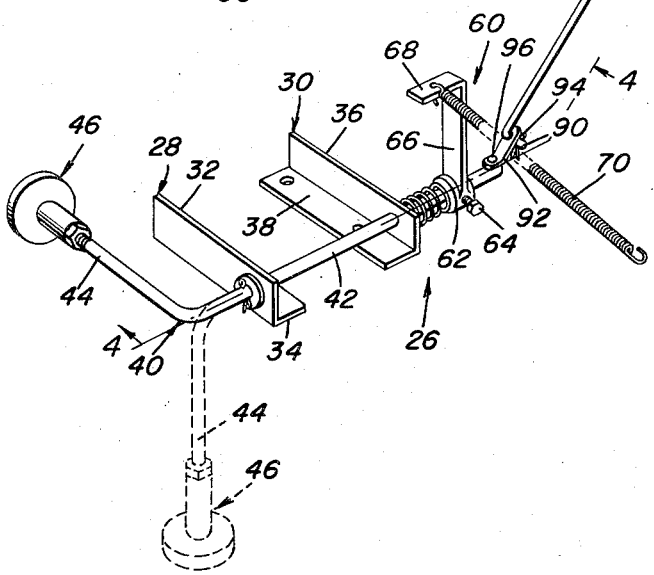
Fred H. Etzelt
INVENTOR.
BY
Attorneys

United States Patent Office 2,803,937
Patented Aug. 27, 1957

2,803,937

AUXILIARY SUPPORTING MEANS FOR POWER MOWERS

Fred H. Etzelt, Delray Beach, Fla.

Application November 14, 1955, Serial No. 546,492

6 Claims. (Cl. 56—26)

This invention relates in general to new and useful improvements in power mowers, and more specifically to an improved power mower attachment.

Many of the power mowers of the reel type are provided with drive wheels which are connected to the engine of the power mower by means of a simple clutch. However, the clutches simply do not operate properly with the result that when it is desired to continue to run the power mower and at the same time stop the travel thereof, this cannot be accomplished without holding onto the handle of the mower and permitting the wheels to slip. This is both hard on the engine and the drive assembly for the wheels as well as on the operator.

It is therefore the primary object of this invention to provide an improved support attachment for power mowers which may be mounted upon power mowers of the reel type, the support attachment including a foot which will engage the ground in front of the power mower and tilt the power mower upwardly and rearwardly so that the power mower will rest upon the roller thereof and the foot with the wheels of the power mower out of engagement with the ground so that the wheels may continue to turn and the engine run at the same time permitting the power mower to remain stationary.

Still another object of this invention is to provide a simple support for a power mower, the support being of such a nature whereby the power mower may be supported in a tilted back position resting primarily upon the roller thereof to render the drive wheels inoperative.

A further object of this invention is to provide a support attachment for power mowers which is so constructed whereby it may be attached to any power mower of the reel type with a minimum of effort.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged perspective view of the support attachment removed from the power mower and shows the specific details thereof, a ground engaging position of the foot being shown by dotted lines;

Figure 2:
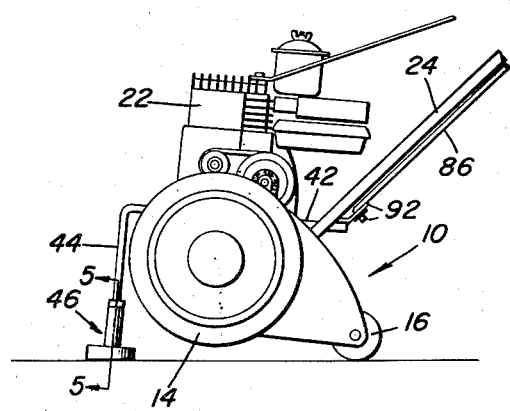
Figure 2 is a side elevational view of the power mower of Figure 1 on a reduced scale and shows the support attachment in use supporting the power mower with the drive wheels thereof out of engagement with the ground.

Figure 4 is an enlarged fragmentary longitudinal vertical sectional view taken through the support attachment along line 4—4 of Fig. 3 and shows further the details thereof; and Figure 5 is an enlarged vertical sectional view taken through the foot of the support attachment along line 5—5 of Fig. 2 and shows the specific details thereof as well as the details of the adjustable connection between the foot and its associated support arm.

Figure 1:
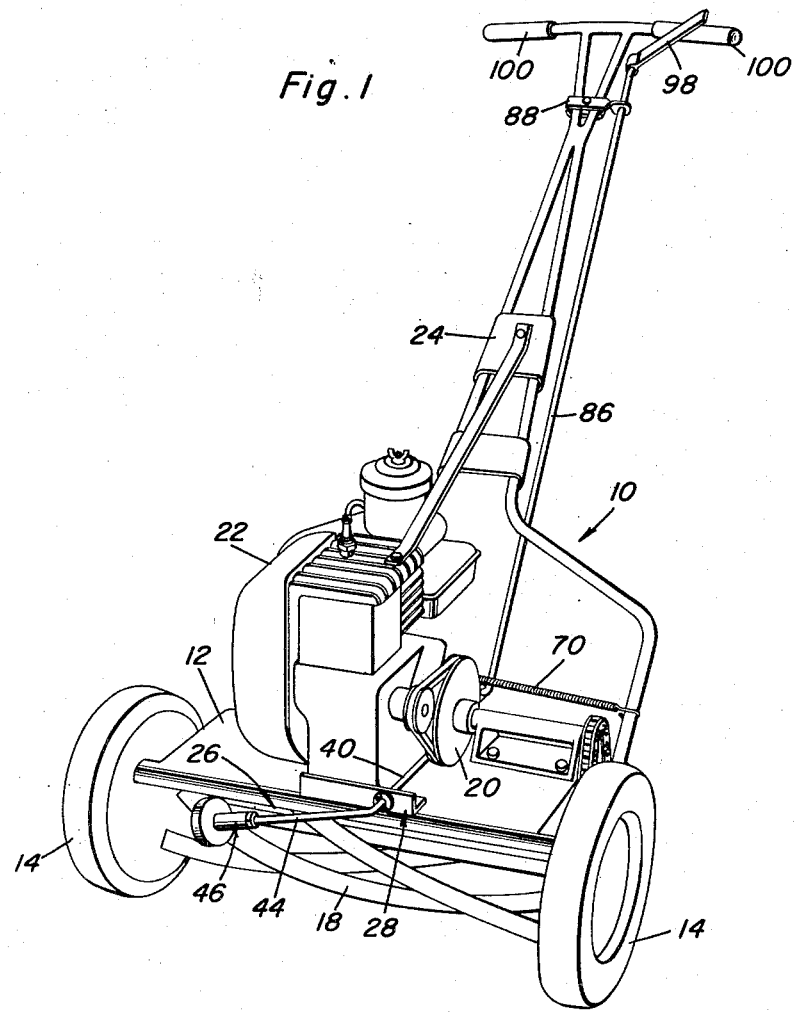
Figure 1 is a front perspective view of a power mower of the reel type which has mounted thereon the support attachment which is the subject of this invention.

Referring now to the drawings in detail, it will be seen that there is illustrated in Figure 1 a conventional type of power lawn mower, the lawn mower being of the reel type and being referred to in general by the reference numeral 10. The power mower 10 includes a suitable frame 12 which is supported primarily by a pair of drive wheels 14 and has an auxiliary support in the form of a roller 16 which is disposed rearwardly of the frame 12, as is best illustrated in Figure 2.

Carried by the frame 12 is a reel 18 which is suitably driven together with the wheels 14 by a drive assembly 20 connected to an internal combustion engine 22. Extending upwardly from the rear part of the frame 12 is a control handle 24. It is to be understood that the power mower 10 also includes other elements which are immaterial with respect to the present invention.

Carried by the power mower 10 is the support attachment which is the subject of this invention, the support attachment being referred to in general by the reference numeral 26. Referring now to Figures 3 and 4 in particular, it will be seen that the support attachment 26 includes a pair of spaced angle brackets 28 and 30 which function as mounting brackets for the support attachment 26. The angle bracket 28 includes a vertical flange 32 and a horizontal flange 34. The angle bracket 30 includes a vertical flange 36 and a horizontal flange 38 disposed in opposed relation with respect to the horizontal flange 34.

The support attachment 26 also includes a support arm which is referred to in general by the reference numeral 40. The support arm 40 is generally L-shaped in outline and includes a first portion 42 which extends through the vertical flanges 32 and 36 and is journaled therein for pivotal movement. The support arm 40 includes a second portion 44 which is integral with the first portion 42 and disposed at right angles thereto at the forward end thereof. Adjustably carried by the free end of the second portion 44 is a ground engageable foot, which is referred to in general by the reference numeral 46.

Referring now to Figure 5 in particular, it will be seen that the foot 46 includes an elongated sleeve 48 having a mounting flange 50 at the lower end thereof. Removably mounted over the mounting flange 50 is a rubber pad 52.

The sleeve 48 is internally threaded as at 54 and has adjustably received therein a threaded portion 56 of the second portion 44. A lock nut 58 retains the sleeve 48 in adjusted position on the second portion 44 of the support arm 40.

Secured to the rear part of the first portion 42 is an arm assembly which is referred to in general by the reference numeral 60. The arm assembly 60 includes a mounting hub 62 which is positioned on the rear part of the first portion 42 by means of a set screw 64. Extending upwardly from the hub 62 is a first arm 66 which has formed integrally therewith an arm 68 which extends forwardly from the arm 66 and which is disposed generally parallel to the first portion 42 of the support arm 40. Connected to the arm 68 is a tension spring 70.

Referring now to Figure 4 in particular, it will be seen that the forward part of the first portion 42 is provided with a stop washer 72 which is retained against forward movement by means of a cotter pin 74 extending through the first portion 42. Positioned on the rear part of the first portion 42 adjacent the hub 62 is a stop washer 76 which is retained against rearward movement by means of a cotter pin 78 extending through the rear part of the first portion 42. A third washer 80 is mounted on the rear part of the first portion 42 in abutment with the rear surface of the flange 36. Mounted on the first portion 42 and extending between the washers 76 and 78 is a spring 84 which urges the control arm to the right, as viewed in Figure 4, the washer 72 limiting such movement of the control arm 40.

In order that the control arm 40 may be pivoted from the solid line position of Figure 3 to the dotted line position of that figure for moving the foot 46 into a ground engaging position, there is provided a control rod 86. The control rod 86 is pivotally mounted adjacent its upper end in a two-piece support 88 and has the lower end thereof bent to form a depending finger 90. The finger 90 extends through a link 92 and is retained therein by a cotter pin 94. The opposite end of the link 92 is pivotally connected to the rear end of the first portion 42 by means of a pivot 96. The upper end of the control rod 86 is provided with a handle 98 to facilitate pivoting thereof.

The support attachment 26 is mounted on the lawn mower 10 by means of the mounting brackets 28 and 30. The mounting brackets 28 and 30 are positioned upon the frame 12 in the same respective relation as illustrated in Figure 3 with the mounting bracket 28 being disposed forwardly of the engine 22 and the mounting bracket 30 (not shown in Figure 1) being mounted rearwardly of the engine 22. The spring 70 has the opposite end thereof connected to the frame 12 through its attachment to the handle 24. The mounting bracket 88 is clamped to the handle 24 adjacent the upper end thereof whereby the handle 98 of the control rod 86 is disposed closely adjacent grip portions 100 of the handle 24.

Normally the foot 46 is retained in a horizontal, inoperative position by the spring 70. However, when it is desired to stop the power mower without stopping the engine 22, it is merely necessary to tilt the power mower 10 back on the roller 16 by pulling back on the handle 24. Then by utilizing the handle 98, the control rod 86 is pivoted to swing the foot 46 around to the dotted line position of Figure 3 and the solid line position of Figure 2. The power mower 10 is then permitted to again tilt forwardly so that it is supported on the roller 16 and the foot 46. In order to prevent accidental tipping of the power mower 10, it is desired that the foot 46 be placed as near as possible to the center of the power mower 10.

When the power mower 10 is propped up on the roller 16 and the foot 46, the spring 70 is insufficient to return the foot 46 to its normal solid line position of Figures 1 and 3. At the same time, the drive wheels 14 are supported above the ground so as to be ineffective. The present invention supersedes the normal clutch utilized for attempting to stop the driving of the power wheels 14 while the engine 22 is running. It is readily apparent that the present invention may be easily mounted on all types of power mowers which utilize a reel and have a roller, such as the roller 16.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In combination with power mowers of the type including a frame, a rear supporting roller, drive wheels and a handle, a support attachment comprising a support arm extending longitudinally of said frame and pivotally mounted thereon, a ground engageable foot carried by said support arm forwardly of said frame for supporting said power mower in conjunction with said roller with said drive wheels disposed out of engagement with the ground, and means connected to said support arm for selectively pivoting said support arm to position said foot.

2. In combination with power mowers of the type including a frame, a rear supporting roller, drive wheels and a handle, a support attachment comprising a support arm extending longitudinally of said frame and pivotally mounted thereon, a ground engageable foot carried by said support arm forwardly of said frame for supporting said power mower in conjunction with said roller with said drive wheels disposed out of engagement with the ground, and means connected to said support arm for selectively pivoting said support arm to position said foot, a spring member extending between said support arm and said frame normally urging said support arm to position wherein said foot is inoperative.

3. In combination with power mowers of the type including a frame, a rear supporting roller, drive wheels and a handle, a support attachment comprising a support arm extending longitudinally of said frame and pivotally mounted thereon, a ground engageable foot carried by said support arm forwardly of said frame for supporting said power mower in conjunction with said roller with said drive wheels disposed out of engagement with the ground, and means for selectively pivoting said support arm to position said foot, said means including a control rod slidably carried by said handle and connected to said support arm.

4. In combination with power mowers of the type including a frame, a rear supporting roller, drive wheels and a handle, a support attachment comprising a support arm extending longitudinally of said frame and pivotally mounted thereon, a ground engageable foot carried by said support arm forwardly of said frame for supporting said power mower in conjunction with said roller with said drive wheels disposed out of engagement with the ground, and means for selectively pivoting said support arm to position said foot, a spring member extending between said support arm and said frame normally urging said support arm to position wherein said foot is inoperative, said means including a control rod slidably carried by said handle and connected to said support arm.

5. In combination with power mowers of the type including a frame, a rear supporting roller, drive wheels and a handle, a support attachment comprising a support arm extending longitudinally of said frame and pivotally mounted thereon, a ground engageable foot carried by said support arm forwardly of said frame for supporting said power mower in conjunction with said roller with said drive wheels disposed out of engagement with the ground, and means connected to said support arm for selectively pivoting said support arm to position said foot, said foot being adjustably mounted on said support arm.

6. A support attachment for power mowers comprising a pair of spaced mounting brackets, a support arm, said support arm including a first portion journaled in said mounting brackets and a second portion disposed at right angles to said first portion, a foot carried by said second portion, a control lever connected to said support arm for positioning said foot, and spring means connected to said support arm for urging said foot to an inoperative position.

References Cited in the file of this patent

UNITED STATES PATENTS

| | | |
|---|---|---|
| 1,135,683 | Graham | Apr. 13, 1915 |
| 1,417,485 | Baldwin | May 30, 1922 |
| 2,138,239 | Irgens | Nov. 29, 1938 |
| 2,152,252 | Godwin et al. | Mar. 28, 1939 |
| 2,597,981 | Fishburn | May 27, 1952 |
| 2,698,507 | Siebring | Jan. 4, 1955 |